United States Patent
Kim et al.

(10) Patent No.: US 12,402,752 B2
(45) Date of Patent: Sep. 2, 2025

(54) GRILL MODULE

(71) Applicant: ANIAI, INC, Seoul (KR)

(72) Inventors: Sojung Kim, Seoul (KR); Seohyeon Kim, Seoul (KR); Gunpil Hwang, Seoul (KR)

(73) Assignee: ANIAI, INC, Seoul (KR)

( * ) Notice: Subject to any disclaimer, the term of this patent is extended or adjusted under 35 U.S.C. 154(b) by 937 days.

(21) Appl. No.: 17/546,750

(22) Filed: Dec. 9, 2021

(65) Prior Publication Data

US 2023/0039555 A1 Feb. 9, 2023

(30) Foreign Application Priority Data

Aug. 5, 2021 (KR) .......................... 10-2021-0103155
Oct. 1, 2021 (KR) .......................... 10-2021-0130511

(51) Int. Cl.
*A47J 37/06* (2006.01)
*A47J 36/32* (2006.01)
*A47J 37/08* (2006.01)

(52) U.S. Cl.
CPC .......... *A47J 37/0611* (2013.01); *A47J 36/32* (2013.01); *A47J 37/06* (2013.01); *A47J 37/08* (2013.01)

(58) Field of Classification Search
CPC ......... A47J 37/0611; A47J 37/06; A47J 27/14
See application file for complete search history.

(56) References Cited

U.S. PATENT DOCUMENTS

| | | | | |
|---|---|---|---|---|
| 3,776,124 A | * | 12/1973 | Morley | A47J 37/0611 99/335 |
| 4,567,819 A | * | 2/1986 | Adamson | A47J 37/044 99/425 |
| 5,172,328 A | * | 12/1992 | Cahlander | A47J 27/14 700/211 |
| 5,249,914 A | * | 10/1993 | Cahlander | A47J 27/14 414/794.3 |
| 5,365,835 A | * | 11/1994 | Naramura | G07F 11/70 99/357 |
| 5,493,958 A | * | 2/1996 | Naramura | A21C 15/02 99/357 |
| 5,540,943 A | * | 7/1996 | Naramura | A21C 9/04 426/231 |
| 5,847,365 A | * | 12/1998 | Harter | A47J 37/0611 219/442 |

(Continued)

FOREIGN PATENT DOCUMENTS

| | | |
|---|---|---|
| JP | 06-086734 A | 3/1994 |
| JP | 07-213769 A | 9/1995 |

(Continued)

OTHER PUBLICATIONS

Office Action for Korean Appln No. 2021-130511 dated Oct. 21, 2022, all pages.

*Primary Examiner* — Sean M Michalski
(74) *Attorney, Agent, or Firm* — Kilpatrick Townsend & Stockton LLP

(57) ABSTRACT

Provided is a grill module for cooking an object to be cooked. The grill module includes a lower plate grill on which a flat object to be cooked is placed, an upper plate grill facing the lower plate grill to cook the object to be cooked, and a transfer unit to transfer a guide and a spatula for placing the object to be cooked onto the lower plate grill and taking out a completely cooked object.

10 Claims, 20 Drawing Sheets

(56) References Cited

U.S. PATENT DOCUMENTS

| | | | | |
|---|---|---|---|---|
| 6,095,036 | A * | 8/2000 | Tocchet | G07F 17/0078 62/250 |
| 7,174,830 | B1 * | 2/2007 | Dong | B25J 9/0087 99/348 |
| 9,642,996 | B2 * | 5/2017 | Palmer | A61J 7/0418 |
| 9,815,191 | B2 * | 11/2017 | Oleynik | A47J 36/321 |
| 2007/0000393 | A1 * | 1/2007 | Lam | A47J 37/0611 99/372 |
| 2007/0006740 | A1 * | 1/2007 | Lam | A47J 37/0611 99/372 |
| 2007/0186923 | A1 * | 8/2007 | Poutiatine | G16H 20/13 128/200.14 |
| 2014/0154384 | A1 * | 6/2014 | Vardakostas | G07F 17/0078 426/531 |
| 2015/0290795 | A1 * | 10/2015 | Oleynik | B25J 9/0081 700/257 |
| 2015/0305554 | A1 * | 10/2015 | Dorsten | A47J 37/0611 426/523 |
| 2016/0059412 | A1 * | 3/2016 | Oleynik | B25J 19/02 700/250 |
| 2016/0183728 | A1 * | 6/2016 | Moma-M04-Us1-App-Ads | B26D 7/34 426/466 |
| 2017/0348854 | A1 * | 12/2017 | Oleynik | A47J 47/02 |
| 2019/0261671 | A1 * | 8/2019 | Vardakostas | A23P 20/20 |
| 2019/0320846 | A1 * | 10/2019 | Nevarez | A47J 37/044 |

FOREIGN PATENT DOCUMENTS

| | | | |
|---|---|---|---|
| JP | 3557591 | B2 | 8/2004 |
| KR | 102079651 | B1 | 2/2020 |

\* cited by examiner

GRILL MODULE

CROSS-REFERENCE TO RELATED APPLICATION

This application is based on and claims priority under 35 U.S.C. § 119 to Korean Patent Application No. 10-2021-0103155, filed on Aug. 5, 2021, and Korean Patent Application No. 10-2021-0130511, filed on Oct. 1, 2021, in the Korean Intellectual Property Office, the disclosures of which are incorporated by reference herein in their entireties.

BACKGROUND

1. Field

The present disclosure relates to a grill module for cooking an object to be cooked, and a patty grill module for cooking a patty in an automatic hamburger production system.

2. Description of the Related Art

The decrease in labor force due to the rise in labor costs, population aging, low birth rates, etc., and avoidance of simple and repetitive work are driving automation for unmanned operation in many industrial fields. Also in the restaurant industry, efforts are being made to solve these issues through automated unmanned apparatuses and systems. The hamburger market has the largest number of restaurants that serve a single dish in the restaurant industry.

Japanese Patent No. 3557591 discloses a hamburger preparing apparatus which is operable in a relatively small kitchen and capable of preparing various types of hamburgers and improving productivity.

SUMMARY

The present disclosure is to provide a grill module for cooking an object to be cooked. The present disclosure is also to provide a patty grill module for cooking a patty in an automatic hamburger production system.

Additional aspects will be set forth in part in the description which follows and, in part, will be apparent from the description, or may be learned by practice of the presented embodiments of the disclosure.

According to an embodiment of the present disclosure, a grill module includes a lower plate grill on which a flat object to be cooked is placed, an upper plate grill facing the lower plate grill to cook the object to be cooked, and a transfer unit to transfer a guide and a spatula for placing the object to be cooked onto the lower plate grill and taking out a completely cooked object.

At least one upper plate grill may be formed, at least one lower plate grill may be formed, and the at least one lower plate grill may be connected to a lifting linear unit.

One upper plate grill may be formed, the at least one lower plate grill may include a first lower grill and a second lower grill, the first lower grill may be connected to a first lifting linear unit, and the second lower grill may be connected to a second lifting linear unit.

The transfer unit may include a first linear unit to move the guide and the spatula in a first direction (x-axis), and a second linear unit mounted on one side of the first linear unit, and the second linear may include a guide linear unit and a spatula linear unit on which the guide and the spatula are mounted to be moved in a second direction, respectively.

The guide may form, with its frame, a space to surround a perimeter of the object to be cooked before or after being placed onto the lower plate grill, and may be mounted on the guide linear unit, and the spatula may form a plate supporting a bottom surface of the object to be cooked, and may be mounted on the spatula linear unit.

The guide and the spatula may be used for semi-automation of receiving, from an external source with intervention of a human user, the object to be cooked, which is not cooked, and taking out the completely cooked object after cooking, the guide may form, with its frame, a space to surround a perimeter of the completely cooked object after being placed onto the lower plate grill, and may be mounted on the guide linear unit, and the spatula may form a plate supporting a bottom surface of the completely cooked object surrounded by the frame of the guide, and may be mounted on the spatula linear unit.

The guide and the spatula may be used for automation of supplying the object to be cooked, which is not cooked, by itself and taking out the completely cooked object after cooking. The guide may form, with its frame, a first space and a second space, which are respectively adjacent to opposite edges of an intermediate space, to selectively surround, within the first and second spaces, a perimeter of the object to be cooked or the completely cooked object before or after being placed onto the lower plate grill, and may be mounted on the guide linear unit. The spatula may be arranged in the intermediate space, may be formed as a symmetrical plate, which selectively operates in the first space and the second space to support a bottom surface of the object to be cooked or the completely cooked object, and may be mounted on the spatula linear unit.

The grill module may further include a cooking target supply unit configured to store objects to be cooked, which are to be supplied to the lower plate grill, and to discharge, in the sense of supply, one sheet of the objects to be cooked at a time.

The cooking target supply unit may include a cache for accommodating a plurality of objects to be cooked stacked therein, the cache including a discharge port at a lower side thereof, a separation spatula to withdraw one sheet of the plurality of objects to be cooked, while being inserted and withdrawn between the plurality of objects to be cooked through the discharge port, separation bars at both sides of the separation spatula to be in contact with a perimeter of the object to be cooked, and holding members to be folded when inserted and to be unfolded when withdrawn to pull the object to be cooked, with elastic members at front ends of the separation bars.

The object to be cooked may include at least one of bread, a patty, and steak meat.

According to an embodiment of the present disclosure, a patty grill module includes a lower plate grill on which a patty to be cooked is placed, an upper plate grill facing the lower plate grill to cook the patty to be cooked, and a transfer unit to transfer a guide and a spatula for placing the patty to be cooked onto the lower plate grill and taking out a completely cooked patty.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
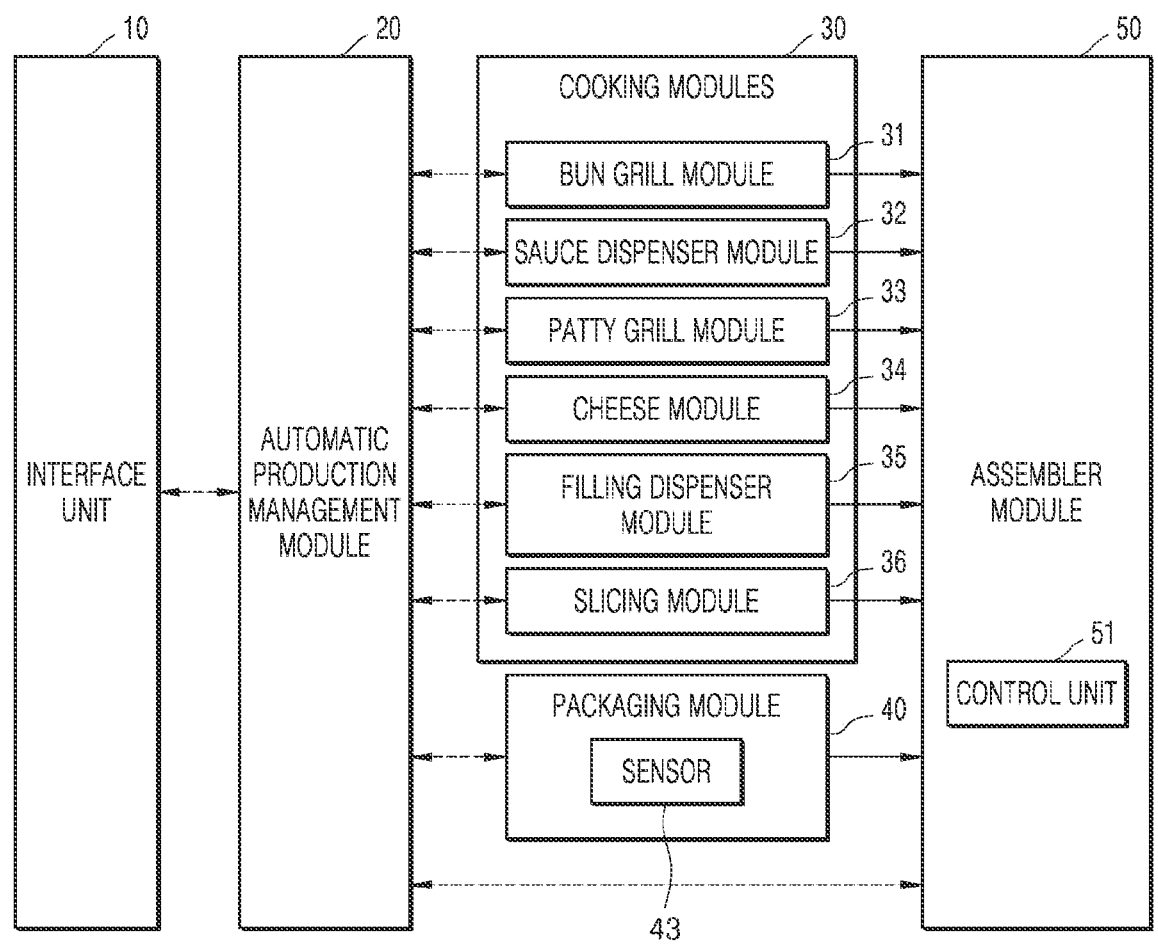
FIG. 1 is a block diagram illustrating an automatic hamburger production system, according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will now be described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein. In order to clearly describe the present disclosure, portions that are not relevant to the description of the present disclosure are omitted, and similar reference numerals are assigned to similar elements throughout the present specification.

It should be understood that when an element is referred to as being "connected to" or "coupled to" another element, the element may be directly connected or coupled to the other element or may be connected or coupled to the other element with an intervening element therebetween. It should also be understood that, on the other hand, when an element is "directly connected" or "directly coupled" to another element, there is no intervening element therebetween.

It should be understood that the terms "comprises" and/or "has" used herein specify the presence of stated features, numbers, operations, elements, components, and/or combinations thereof, but do not preclude the presence or addition of one or more other features, numbers, operations, elements, components, and/or combinations thereof. Therefore, when an element is referred to as "including" a component, the element may additionally include other components rather than excluding other components as long as there is no particular opposing recitation.

A grill module according to an embodiment is configured to cook an introduced object to be cooked so as to provide a completely cooked object. The object to be cooked includes at least one of bread, a patty, and steak meat, and includes flat and round food materials. Accordingly, the grill module may be used in cooking various objects to be cooked. For convenience of description, among cooking modules applied to an automatic hamburger production system, a patty grill module for cooking a patty will be described as an example.

FIG. 1 is a block diagram illustrating an automatic hamburger production system, according to an embodiment of the present disclosure. Referring to FIG. 1, the automatic hamburger production system of an embodiment includes an interface unit 10, an automatic production management module 20, a plurality of cooking modules 30, a packaging module 40, and an assembler module 50.

The interface unit 10 performs at least one of checking an operation of the system, controlling the system, ordering production, and managing a schedule. The automatic production management module 20 checks and manages a plurality of modules constituting the system. The cooking modules 30 transmits data to the automatic production management module 20.

The packaging module 40 supplies a package and receives and packages a finished hamburger having been assembled on the package in the cooking modules 30. The assembler module 50 is controlled by the automatic production management module to move the package and the hamburger being prepared, between the cooking modules 20 and the packaging module 40.

For example, the plurality of cooking modules 30 include a bun grill module 31, a sauce dispenser module 32, a patty grill module 33, a cheese module 34, a filling dispenser module 35, and a slicing module 36.

Figure 2:
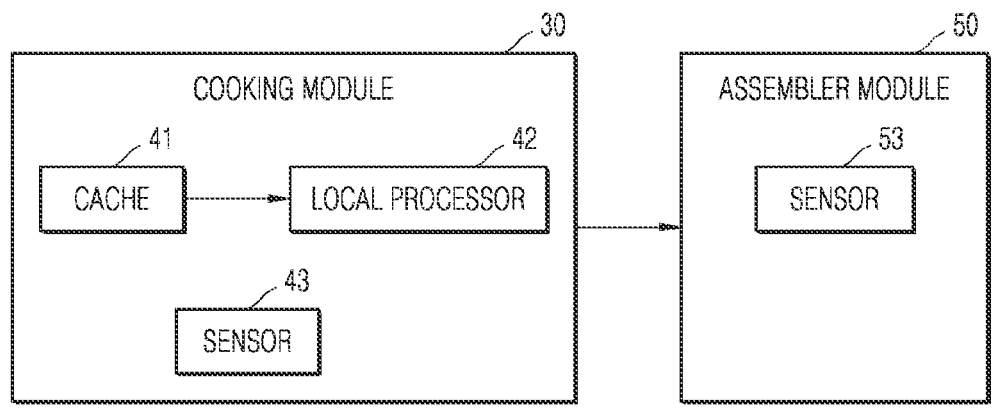
FIG. 2 is a block diagram illustrating a basic configuration of a local module applied to FIG. 1.

FIG. 2 is a block diagram illustrating a basic configuration of a local module applied to FIG. 1. Referring to FIG. 2, the plurality of cooking modules 30 includes a cache 41 for storing, at a refrigeration, freezing, or room temperature, an amount of ingredients for temporary use, and a local processor 42 responsible for functions of individual modules, and a sensor 43 for monitoring the capacity of the cache 41 or whether the local processor 42 is normally operating.

In addition, the packaging module 40 and the assembler module 50 include sensors 43 and 53 for monitoring whether they are normally operating. The sensors 43 and 53 are attached to the cooking modules 30, the packaging module 40, and the assembler module 50, to monitor the capacity of the cache 41 or whether the local processor 42 is normally operating, and may also be attached to the system to perform real-time monitoring of operations performed by the respective modules or between the modules, and real-time monitoring of error situations.

Sensor data collected by the sensors 43 and 53 may be transmitted to the automatic production management module 20 in real time to perform corrective actions through feedback, or may be accumulated to be used for big data-based artificial intelligence learning. In this case, signals includes at least one of video, digital image, infrared, weight, and temperature signals, and the sensors 43 and 53 include at least one of a camera sensor, an audio sensor, an ultrasonic sensor, an infrared sensor, a gravity sensor, a weight sensor, and a temperature sensor.

In a flowchart of ingredients when the plurality of cooking modules 30 are operating, the ingredients stored in the cache 41 are transferred to the local processor 42 through a cache-to-local processor movement, then a cooking operation is performed by the local processor 42, the resulting products are transferred to the assembler module 50 through a local processor-to-assembler module movement to be assembled, and then the assembled product is moved to the next module.

The automatic hamburger production system of FIG. 1 is an example of a configuration that operates as a fully automatic production system using all of the modules. Although not illustrated, the automatic hamburger production system may operate as a partially automatic production system by selectively combining one or more modules according to needs of a user.

For convenience of description, the automatic hamburger production system will be described as a fully automatic production system. First, the interface unit 10, the automatic production management module 20, the plurality of cooking modules 30, the packaging module 40, and the assembler module 50 will be described in detail.

The interface unit 10 is an interface through which the user may check and control the operation of the system, and performs operations of ordering production, initiating and terminating the system, managing a schedule, and checking a system error element.

For example, the interface unit 10 is a digital device having a function of accessing and then communicating with the automatic production management module 20, and includes at least one of a smart phone, a tablet, a smart watch, a smart band, a smart glass, a desktop computer, a monitor, a notebook computer, a workstation, a personal digital assistant (PDA), a web pad, a mobile phone, and a human-machine interface (HMI). That is, a device capable of allowing the user to check a digital output and input information thereto may be adopted as the interface unit 10.

Figure 3:
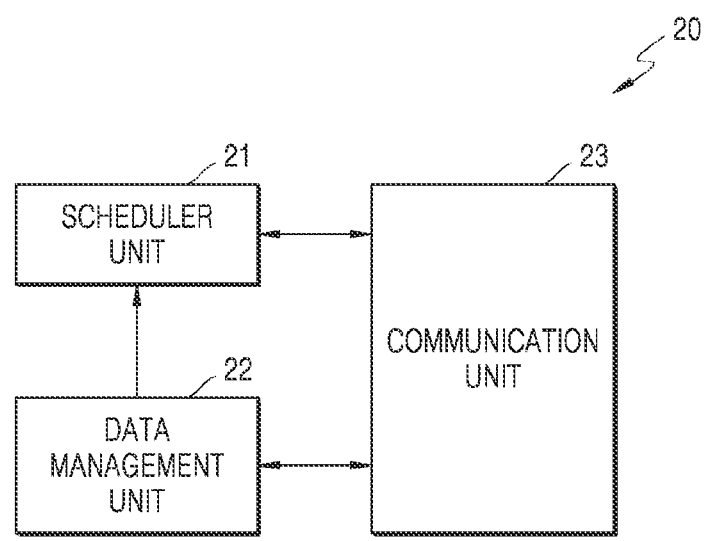
FIG. 3 is a block diagram illustrating an automatic production management module applied to FIG. 1.

FIG. 3 is a block diagram illustrating the automatic production management module 20 applied to FIG. 1. Referring to FIGS. 1 and 3, the automatic production management module 20 includes a scheduler unit 21, a data management unit 22, and a communication unit 23.

The automatic production management module 20 is a digital device having a function of communicating with each module, and may include at least one of a smart phone, a tablet, a smart watch, a smart band, smart glasses, a desktop computer, a monitor, a notebook computer, a workstation, a PDA, and a programmable logic controller (PLC). A digital device including a memory unit and a microprocessor mounted therein and thus having computing capability may be adopted as the automatic production management module 20.

The scheduler unit 21 checks the modules connected to the system and controls the operation order of the modules according to a production process determined by a scheduling algorithm. The scheduler unit 21 may primarily identify the number and states of modules connected to the system. Here, the state includes whether the module is usable, whether an error occurred, whether to the module is cleaned, and the version of the module.

Based on the primarily identified states and number of the modules, the scheduler unit 21 determines a module operation order schedule for producing hamburgers according to types and numbers of hamburger orders input from the interface unit 10, and controls each module through the communication unit 23. Here, the module operation order schedule is determined according to a preset scheduling algorithm.

The scheduler unit 21 may maximally maintain the freshness in cooking by using a reverse scheduling algorithm that estimates a previous module cooking start time inversely calculated from a next module cooking completion time such that a period of time during which the ingredients having been cooked in each module stand by for the ingredient to be completely cooked in the next module is minimized.

The scheduling algorithm includes a built-in scheduling algorithm and a scheduling algorithm which is determined by the user. An example of the built-in scheduling algorithm may be an algorithm that maximizes the per-hour production of hamburgers. In this case, the built-in scheduling algorithm may be updated from a central server through the communication unit 23.

The data management unit 22 signal-processes and manages outputs of the sensors 43 and 53 in each module and transmits the resulting data to the scheduler unit 21. The outputs of the sensors 43 and 53 include all signals involved in a hamburger production process, such as whether an error occurred, video, digital images, infrared signals, weight, temperature, etc. The data management unit 22 may transmit and receive collected data to and from the central server through the communication unit 23.

The data management unit 22 may perform a function of training ingredient management and module control models based on data regarding an input of the interface unit 10. An estimation model according to an embodiment may be implemented by using an artificial neural network such as a convolutional neural network (CNN) and a recurrent neural network (RNN). In addition, descriptions provided herein is merely an embodiment of the present disclosure, and a technique that may be used to implement and train the estimation model may be variously modified within the scope of achieving the object.

The communication unit 23 is configured as a communication network that connects the interface unit 10, the automatic production management module 20, the plurality of cooking modules 30, the packaging module 40, the assembler module 50, and the central server (not shown) to each other. Here, the central server is a central system installed at a location separate from the system, and may be connected through the Internet or World Wide Web (WWW).

The communication unit 23 may be configured to perform both wired communication and wireless communication, and may be configured as at least one of a controller area network (CAN), EtherCAT, TCP/IP Modbus, serial Modbus, a local area network (LAN), a metropolitan area network (MAN), and a wide area network (WAN).

For example, the communication network may be the known Internet or WWW. The communication network may also include part of a known wired/wireless data communication network, a known telephone network, or a known wired/wireless television communication network.

The plurality of cooking modules 30 will be described with reference to FIGS. 1 and 2. The plurality of cooking modules 30 include the cache 41 and the local processor 42 corresponding to respective cooking.

First, the bun grill module 31 is configured to handle bread, and ingredients handled by the bun grill module 31 is not limited to bread, but include cooked rice in a certain shape to replace the role of a burger bun, or an ingredient for vertically wrapping fillings of a hamburger.

Buns are stored in the cache 41 in a frozen state, a refrigerated state, or a room temperature state according to the type and characteristics of the buns, and a cooking time and temperature during cooking may be adjusted by the local processor 42. The cache 41 of the bun grill module 31 may also be configured to block external air so as to prevent the surface of a bun from drying out.

The bun grill module 31 may include the sensors 43, for example, a pressure sensor or a position sensor, and a control unit 51 of the assembler module 50 may appropriately adjust a degree of bun cooking by feeding back an appropriate cooking pressure, time, position, and the like according to the type and state of a bun (e.g., the thickness and temperature of the bun) and monitor the state.

The sensors 43 of the bun grill module 31 may further include a state measurement sensor capable of determining the temperature, hardness, color, and degree of cooking of a bun, and accordingly, the cooking temperature and time of the bun can be adjusted.

The control unit 51 of the assembler module 50 includes any one of a microcontroller unit (MCU), a field-programmable gate array (FPGA), a digital signal processor (DSP), a smart phone, a tablet, a smart watch, a smart band, a smart glass, a desktop computer, a monitor, a notebook computer, a workstation, a PDA, and a PLC. A digital device having computing capability may be adopted as the control unit 51 of the assembler module 50.

The assembler module 50 is configured to transfer, to discharge units of the cooking modules 30 and the packaging module 40, ingredients to be sequentially supplied to a packaging paper sheet or box. The control unit 51 of the assembler module 50 is configured to control the packaging paper sheet or box containing food ingredients to stand by or move, and communicate with the automatic production management module 20.

The control unit 51 controls the assembler module 50 based on an input signal of the automatic production management module 20, and communicates a state of the assembler module 50 to the automatic production management module 20. Here, the state of the assembler module 50 may include whether the assembler module 50 is operable, whether the assembler module 50 is currently operating, whether an error occurred, and an operation speed.

The sauce dispenser module 32 is configured to dispense a sauce or dressing ingredients based on a digital input. Ingredients handled by the sauce dispenser module 32 may include a hamburger sauce, a salad dressing, ice cream syrup, fruit jam, and various edible liquids.

The sauce dispenser module 32 sprays the sauce based on an input signal of the automatic production management module 20. Here, a state of the sauce dispenser module 32 may include at least one of the amount of the remaining sauce, detection of an object at the automatic dispensing position, whether the sauce dispenser module 32 is operable, whether the sauce dispenser module 32 is currently operating, and whether an error occurred.

The patty grill module 33 includes a heating module for heating beef, pork, chicken, or vegan meat, and a fryer module for frying shrimp, chicken, and potato hash brown. For example, the heating module may include a heating device for cooking a patty, and may include, as a heat source, at least one of an induction range, a heating wire, an electromagnetic wave device, and an infrared device.

The heating module may further include a seasoning module (not shown) for seasoning using salt, pepper, and herbs during cooking according to the type of a patty, and a control unit (not shown) of the fryer module may adjust a seasoning time, type, and amount.

For example, the fryer module may perform an operation of putting a patty into oil and taking the patty out of the oil, may filter out residues from the oil after frying, and may perform an oil replacement operation according to an oil acidity measurement result.

Control units applied to the heating module and the fryer module includes at least one of an MCU, an FPGA, a DSP, a smart phone, a tablet, a smart watch, a smart band, a smart glass, a desktop computer, a monitor, a notebook computer, a workstation, a PDA, and PLC. A digital device having computing capability may be adopted as the control unit.

A cache of the patty grill module 33 may be maintained in a frozen state, a refrigerated state, or a non-room temperature state according to the characteristics of a patty, and may include packaging that blocks inflow and internal circulation of external air for maintaining freshness.

The cheese module 34 supplies cheese onto a hamburger being assembled, by the assembler module 50, on a package paper sheet or box at a discharge unit of the cheese module 34. Here, the types of cheese includes at least one of sliced cheese, shredded cheese, and liquid cheese.

The cheese module 34 may supply, directly to the assembler module 50, cheese stored in a cache capable of temporarily storing the cheese at a refrigeration temperature, a freezing temperature, and a room temperature, or may beat the cheese to an appropriate temperature through a local processor such as a hot air blower or an oven and supply the heated cheese to the assembler module 50.

The filling dispenser module 35 supplies, onto the hamburger being assembled on the package paper sheet or box on the discharge unit, fixed amounts of various fillings at a preset speed according to the type of the hamburger. Here, the fillings include onions, lettuce, and pickles.

The filling dispenser module 35 may supply, directly to the assembler module 50, fillings stored in a cache capable of temporarily storing ingredients at a refrigeration temperature, a freezing temperature, and a room temperature, or may supply only the ingredients to the assembler module 50 while blocking liquid flowing out of the fillings by using a local processor such as a liquid blocker.

The slicing module 36 slices various fillings and supplies the sliced fillings to the hamburger being assembled, by the assembler module 50, on the package paper sheet or box at the discharge unit. Here, the fillings include at least one of onions, tomatoes, pickles, and cheese.

The slicing module 36 may cut fillings temporarily stored in the cache 41 capable of maintaining a refrigeration, freezing, or room temperature, into an appropriate thickness through the local processor 42 including at least one of a straight blade, a rotating blade, and a wire blade, and the cut fillings are supplied to the assembler module 50.

Figure 4:
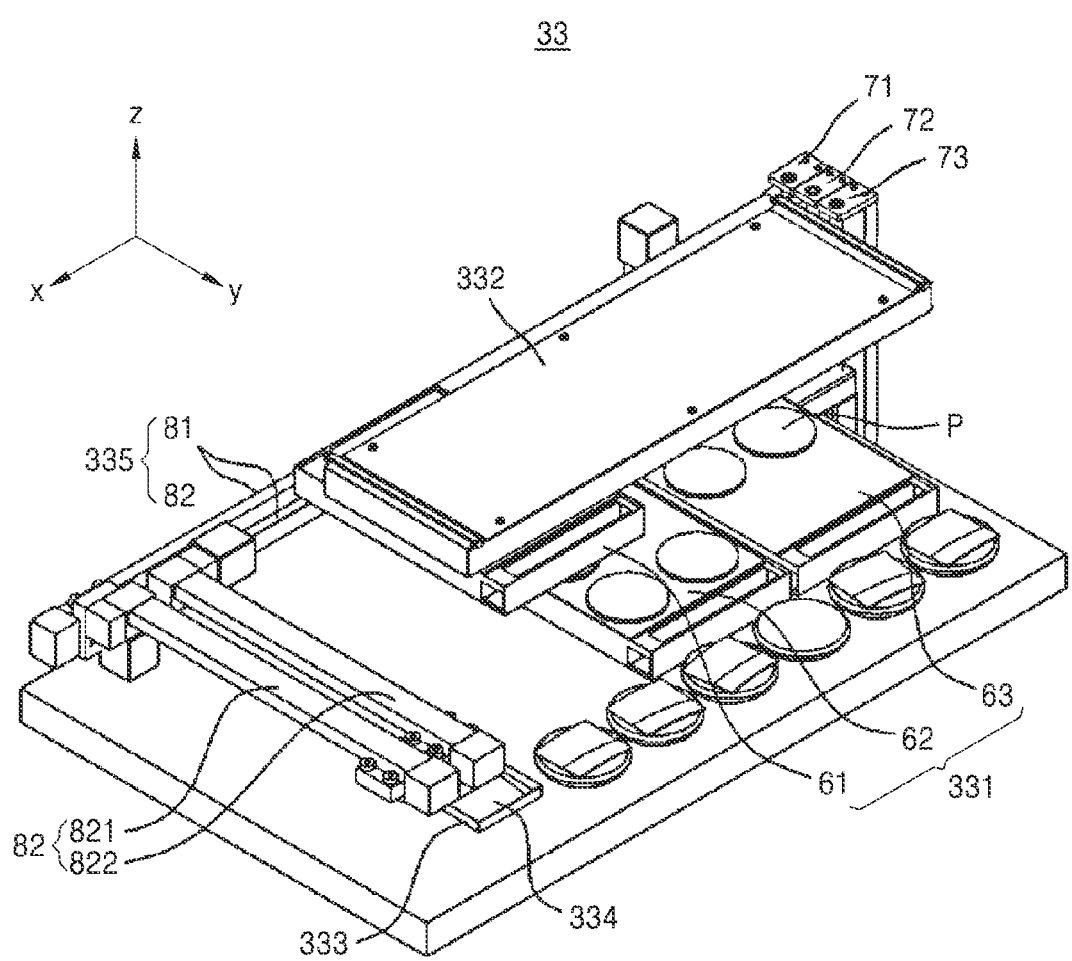
FIG. 4 is a perspective view of a grill, which is a local processor of a patty grill module, applied to FIG. 1.
Figure 5:
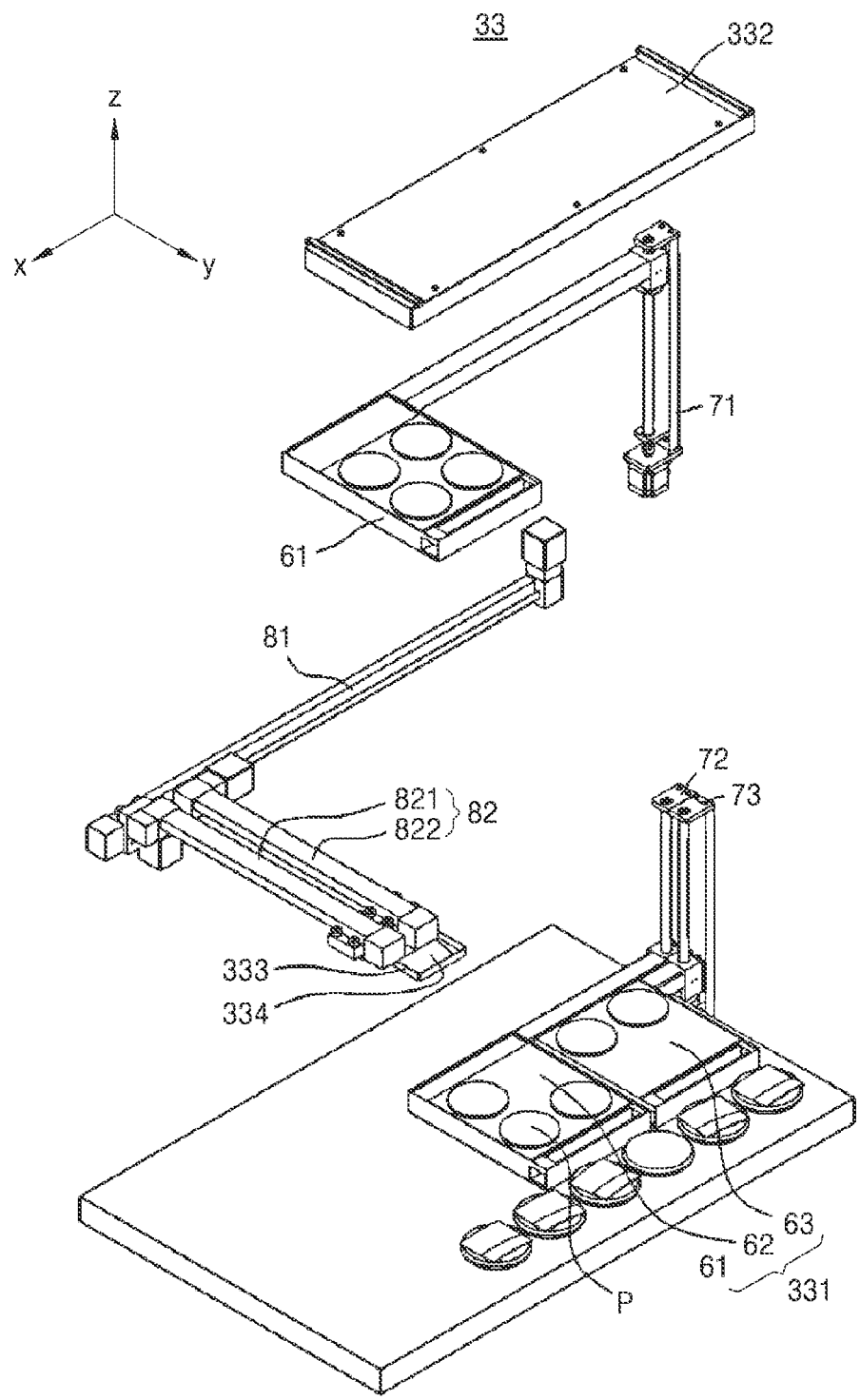
FIG. 5 is an exploded perspective view of the grill of FIG. 4.

FIG. 4 is a perspective view of a grill, which is a local processor of the patty grill module 33, applied to FIG. 1, and FIG. 5 is an exploded perspective view of the grill of FIG. 4. Referring to FIGS. 4 and 5, the patty grill module 33 includes a lower plate grill 331, an upper plate grill 332, and a transfer unit 335 for transferring a guide 333 and a spatula 334.

The lower plate grill 331 is configured to allow a patty P, which is an object to be cooked, to be placed thereon, and the upper plate grill 332 is configured to vertically face the lower plate grill 331 and cook the patty P when in contact with the patty P. The guide 333 and the spatula 334 are configured to input the patty P to the lower plate grill 331 and transfer and take out the cooked patty P, which is a completely cooked object, according to the operation of the transfer unit 335.

The upper plate grill 332 is formed as one unit, and the lower plate grill 331 includes at least a first lower grill 61 and a second lower grill 62. Although the lower plate grill 331 includes three lower grills, which are the first and second lower grills 61 and 62, and a third lower grill 63, in the present embodiment, more lower grills may be added.

For convenience of description, descriptions will be provided with reference to the first, second, and third lower grills 61, 62, and 63. The first lower grill 61 is connected to a first lifting linear unit 71 to be lifted up and down, and the second and third lower grills 62 and 63 are respectively connected to second and third lifting linear units 72 and 73 to be lifted up and down.

The transfer unit 335 includes a first linear unit 81 that moves the guide 333 and the spatula 334 in a first direction (x-axis), and a second linear unit 82 that is mounted on one side of the first linear unit 81. The second linear unit 82 includes a guide linear unit 821 and a spatula linear unit 822, which are respectively mounted with the guide 333 and the spatula 334 and move them in a second direction (y-axis).

Figure 6:
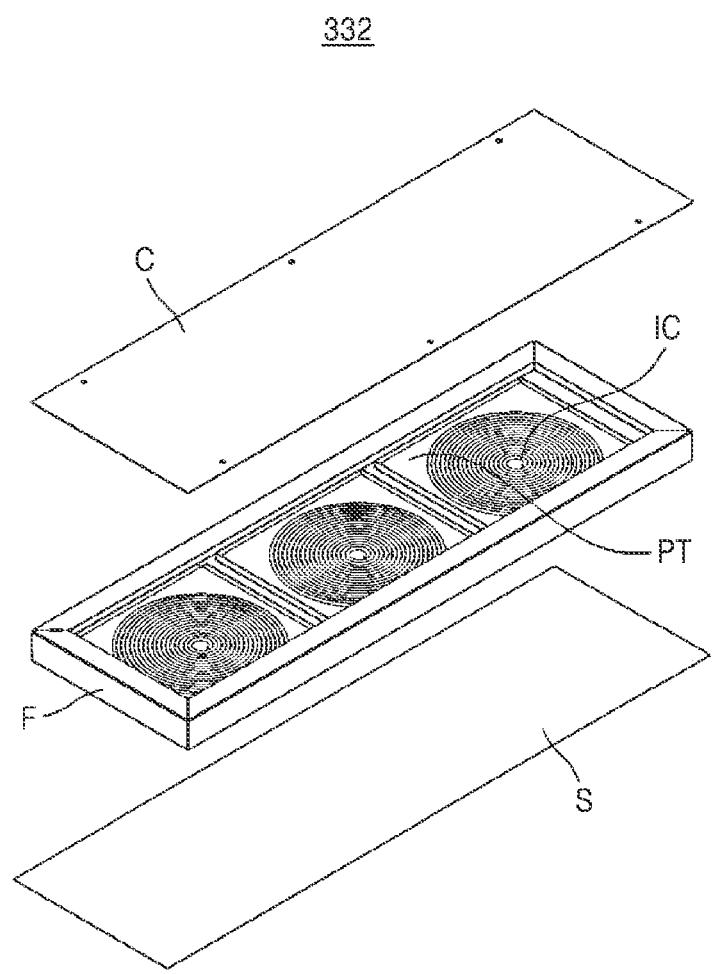
FIG. 6 is an exploded perspective view illustrating an upper plate grill of the grill of FIG. 4.

FIG. 6 is an exploded perspective view illustrating the upper plate grill 332 of the grill of FIG. 4. Referring to FIG. 6, the upper plate grill 332 has induction coils IC embedded in a frame F, induction plates PT provided at the lower portion thereof, a cover C covering the upper side of the induction coils IC, and Teflon sheets S respectively at the lower surfaces of the induction plates PT to prevent the patty P from sticking thereto. The set of the induction coil IC and the induction plate PT is provided to correspond to each of the first, second, and third lower grills 61, 62, and 63. The coating layer of the Teflon sheet S may be replaced, and a clip (not shown) may be provided for detaching the Teflon sheet S.

Figure 7:
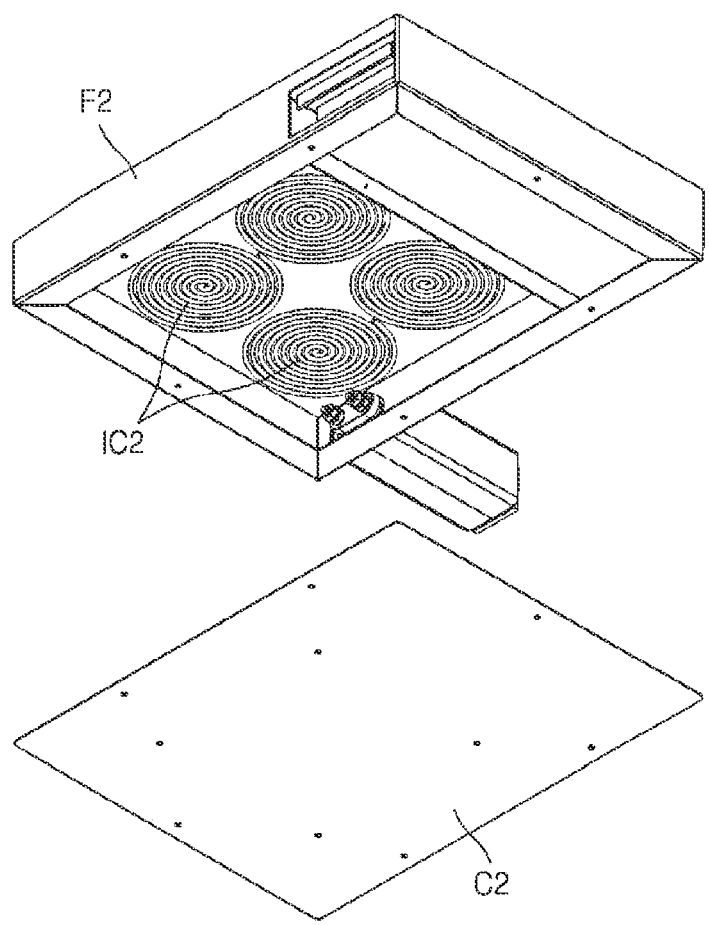
FIG. 7 is an exploded perspective view from the bottom of a lower plate grill of the grill of FIG. 4.
Figure 8:
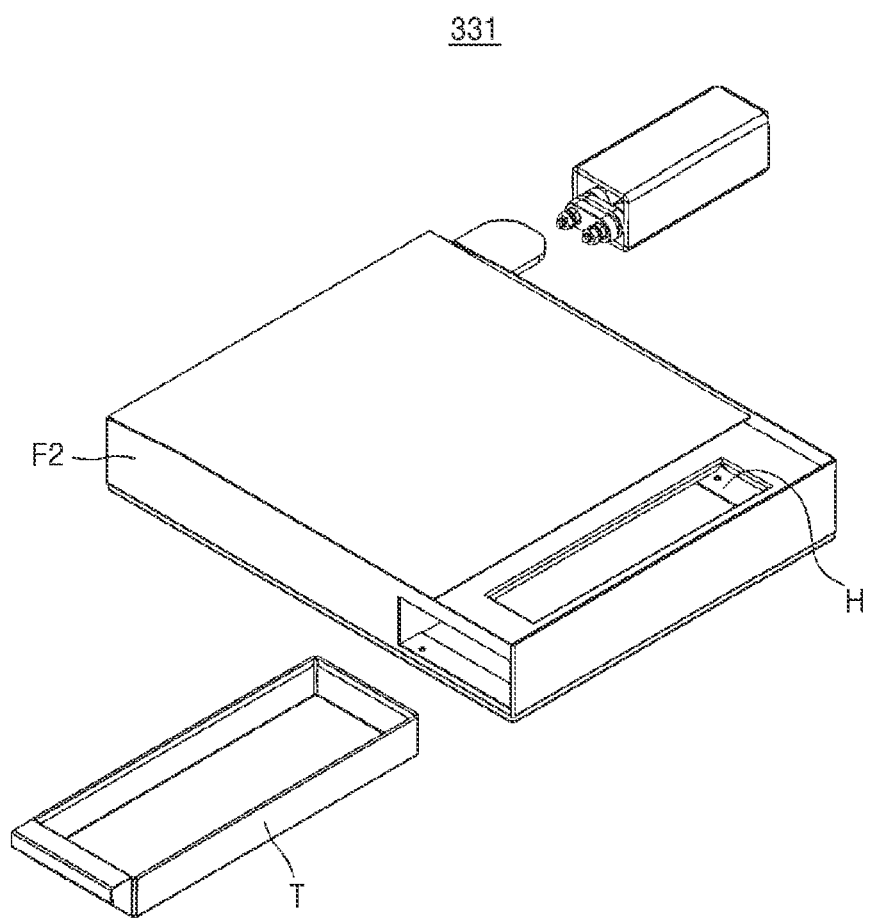
FIG. 8 is an exploded perspective view from the top of the lower plate grill of the grill of FIG. 4.
Figure 9:
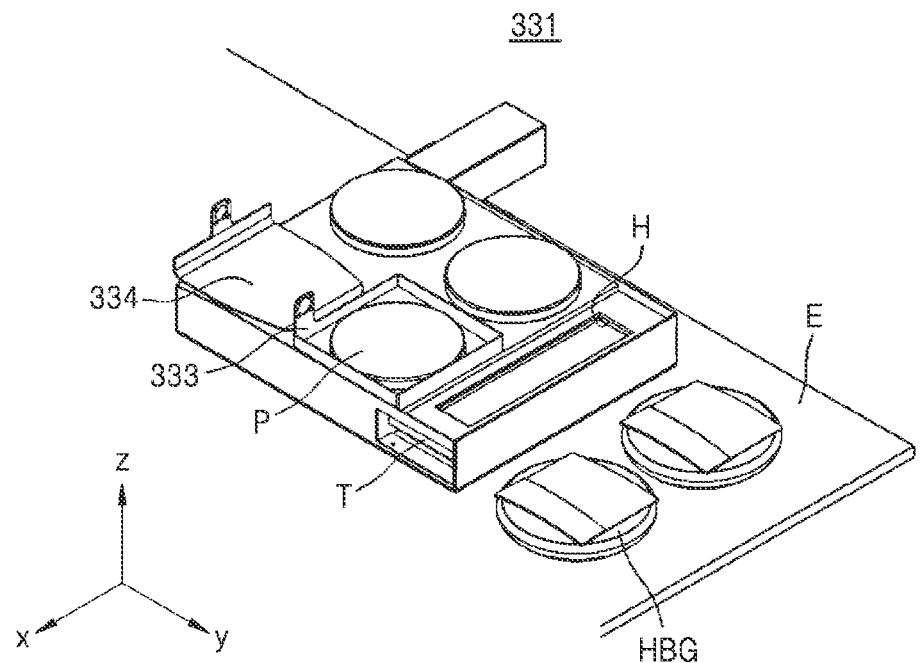
FIG. 9 is a perspective view of an operating state of a spatula and a guide manipulating a patty on a lower plate grill, according to a first embodiment.
Figure 10:
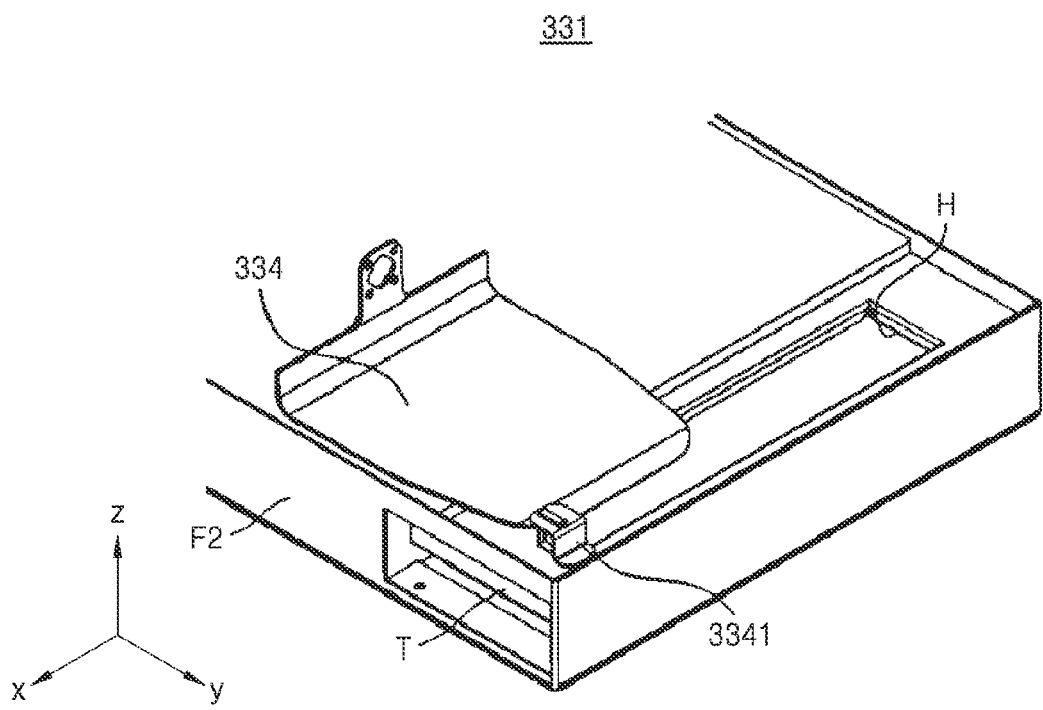
FIG. 10 is a perspective view of an operating state in which a spatula passes through a residue scraper on a lower plate grill.

FIG. 7 is an exploded perspective view from the bottom of the lower plate grill 331 of the grill of FIG. 4, FIG. 8 is an exploded perspective view from the top of the lower plate grill 331 of the grill of FIG. 4, FIG. 9 is a perspective view of an operating state of the spatula 334 and the guide 333 manipulating the patty P on the lower plate grill 331, according to a first embodiment, and FIG. 10 is a perspective view of an operating state in which the spatula 334 passes through a residue scraper 3341 on the lower plate grill 331.

Referring to FIGS. 7 to 10, the lower plate grill 331 includes four induction coils IC2 embedded in a frame F2, and a cover C2 covering the lower side of the induction coils IC2, and the four induction coils IC2 are connected to each other to uniformly transfer heat to each patty P.

Because the induction coils IC2 share one induction circuit, and this affects their inductance values, two of the induction coils IC2 are connected in a parallel manner and the other two of the induction coils IC2 are connected in a series manner in order to maintain the inductance values. In order to minimize a compensation effect due to interference between the induction coils IC2, the induction coils IC2 are connected such that current flows in a clockwise direction in two of the induction coils IC2, and current flows in a counterclockwise direction in the other two of the induction coils IC2 (i.e., two induction coils IC2 with the same direction are located on a diagonal line).

The lower plate grill 331 may include an oil hole H in the frame F2 and an oil tray T that is inserted into and withdrawn from the frame F2. The oil tray (T) may collect and store residues and oil flowed out from the patty (P) having been cooked, and is separable from the lower plate grill 331 and thus may be easily separated and washed even in the operation of the patty grill module 33.

Referring to FIGS. 9 and 10, the guide 333 is formed to have a space defined by its frame to surround the perimeter of the patty P before or after being inserted into the lower plate grill 331, and is mounted on the guide linear unit 821. The spatula 334 is formed with a plate to support the bottom surface of the patty P surrounded by the frame of the guide 333, and is mounted on the spatula linear unit 822. The guide 333 and the spatula 334 may be replaced with one another depending on the type and state of the ingredients.

The spatula 334 is configured to move, onto the lower plate grill 331, the patty P stored in the cache at a freezing, refrigeration, or room temperature, lift up and move the fully cooked patty P onto a hamburger HBG at a discharge unit E, and clean patty residues and oil through a scraping motion in the lower plate grill 331 after cooking. The guide 333 may limit movement of the patty P in a plane direction so as to facilitate moving of the patty P by assisting the operation of the spatula 334.

After scraping the surface of the lower plate grill 331, the spatula 334 may pass through a space of the residue scraper 3341 to remove residues from the spatula 334. The residue scraper 3341 may be formed of a material which may be smoothly in contact with the spatula 334 while maintaining its shape, i.e., an elastic material such as silicone or rubber.

FIG. 11A to FIG. 11H are perspective views illustrating an order of moving a cooked patty on the lower plate grill 331. For convenience of description, descriptions will be provided with reference to the first lower grill 61 of the lower plate grill 331 and the first lifting linear unit 71 connected thereto. FIG. 11A to FIG. 11H illustrate a semi-automatic process in which a person supplies an uncooked object to be cooked and the guide 333 and the spatula 334 are used to take out a completely cooked object after cooking.

Figure 11A:
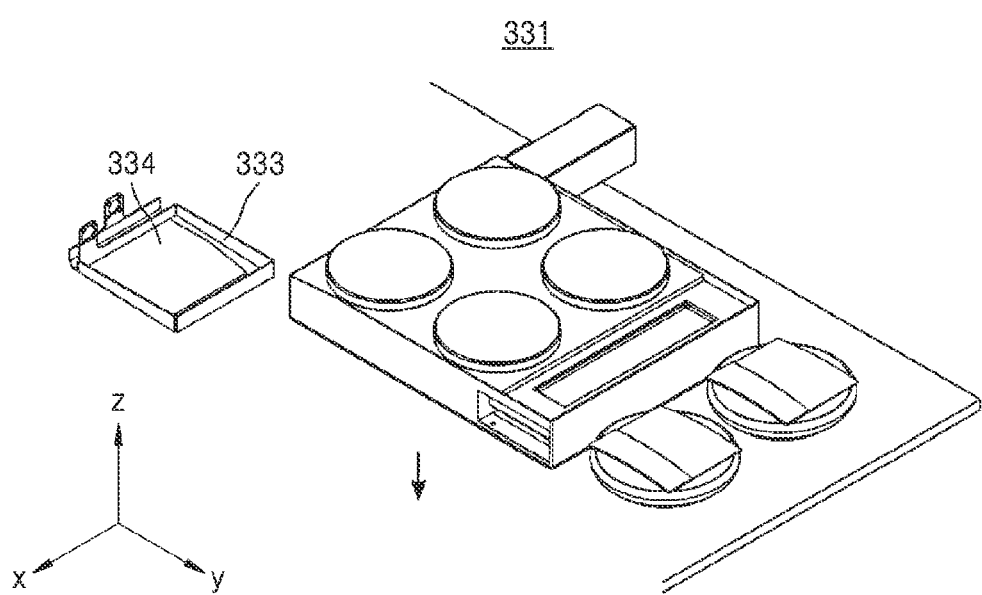
FIG. 11A to FIG. 11H are perspective views illustrating an order of moving a cooked patty on a lower plate grill 331.

First, referring to FIG. 11A, the guide 333 and the spatula 334 approach the first lower grill 61 by the first and second linear units 81 and 82, the guide linear unit 821, and the spatula linear unit 822 of the transfer unit 335. The first lower grill 61 is positioned higher than the guide 333 and the spatula 334 by the first lifting linear unit 71.

Figure 11B:
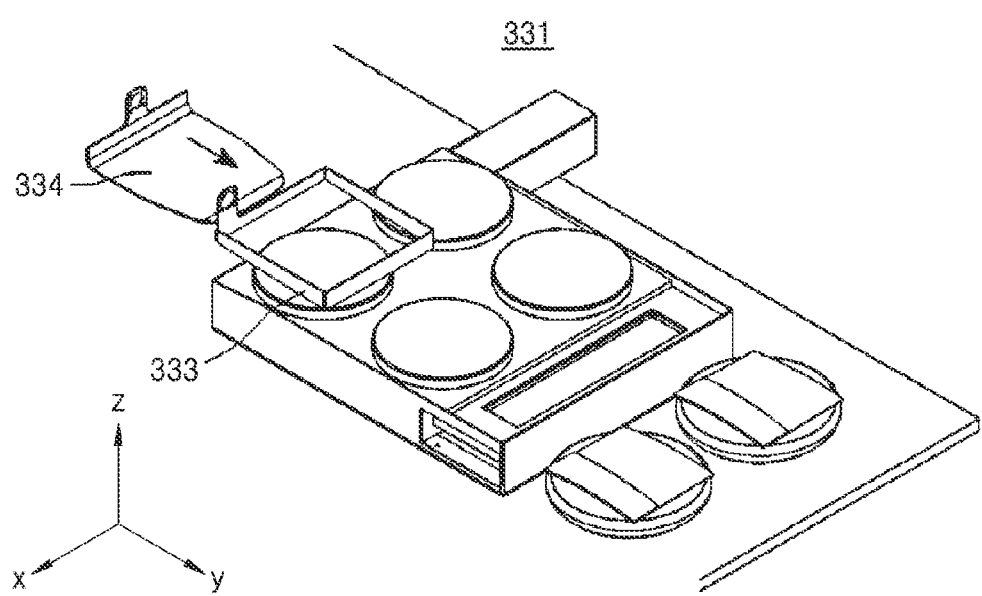

Referring to FIGS. 11A and 11B, in the state of FIG. 11A, the first lifting linear unit 71 descends to lower the height of the first lower grill 61 to a height appropriate for insertion of the guide 333 and the spatula 334.

Figure 11C:
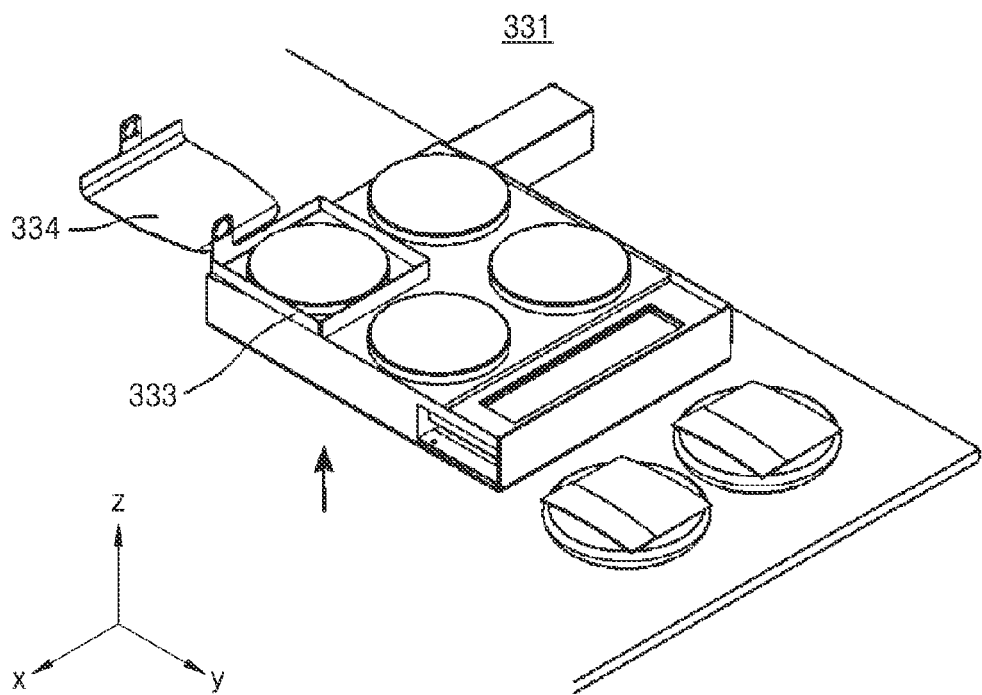

Referring to FIG. 11B, the guide 333 is positioned vertically above a patty by the guide linear unit 821. Referring to FIGS. 11B and 11C, the first lifting linear unit 71 ascends to cause the first lower grill 61 to ascend to be in contact with the guide 333.

Figure 11D:
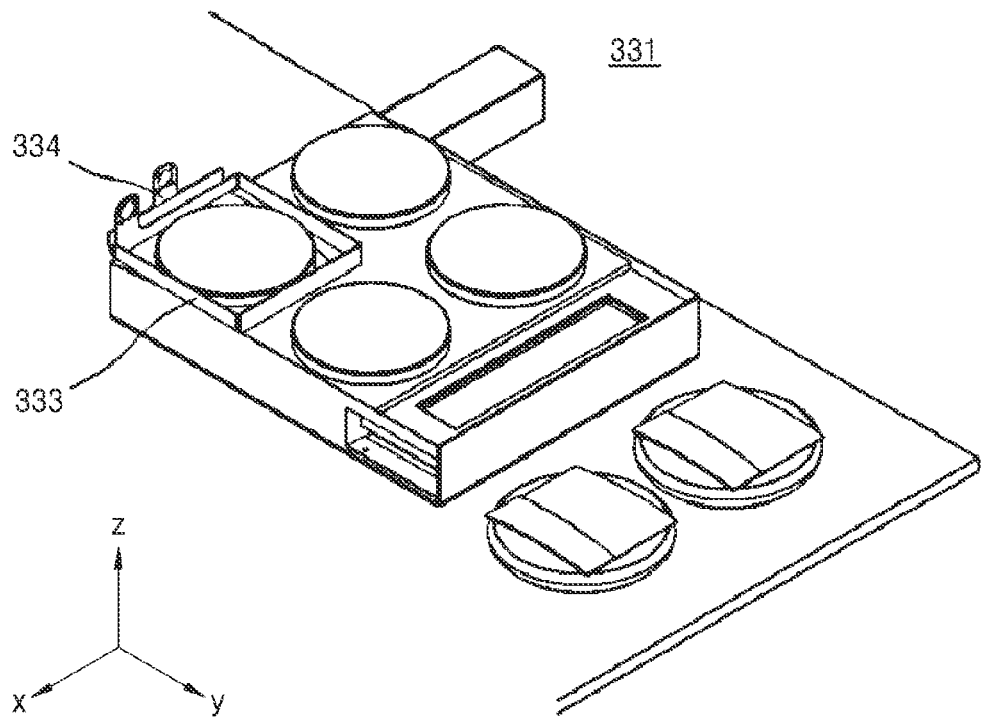

Referring to FIGS. 11C and 11D, in the state of FIG. 11C, the spatula 334 is inserted between the first lower grill 61 and the patty by the spatula linear unit 822.

Figure 11E:
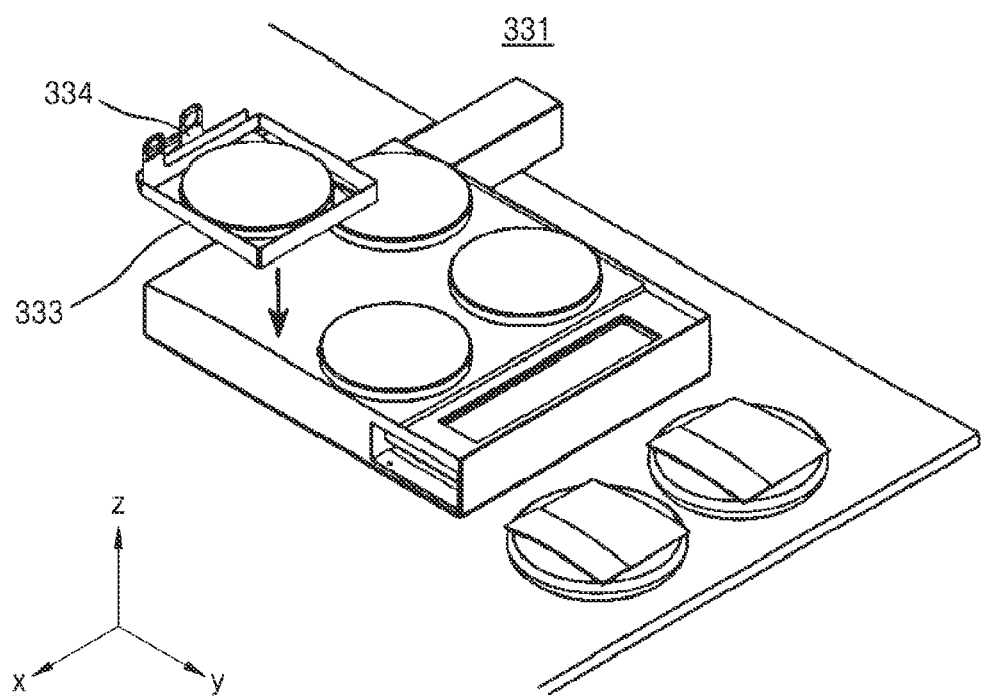

Referring to FIGS. 11D and 11E, in the state of FIG. 11D, the first lower grill 61 descends by the first lifting linear unit 71, and the height of the first lower grill 61 is lowered to a height appropriate for withdrawal of the guide 333 and the spatula 334.

Figure 11F:
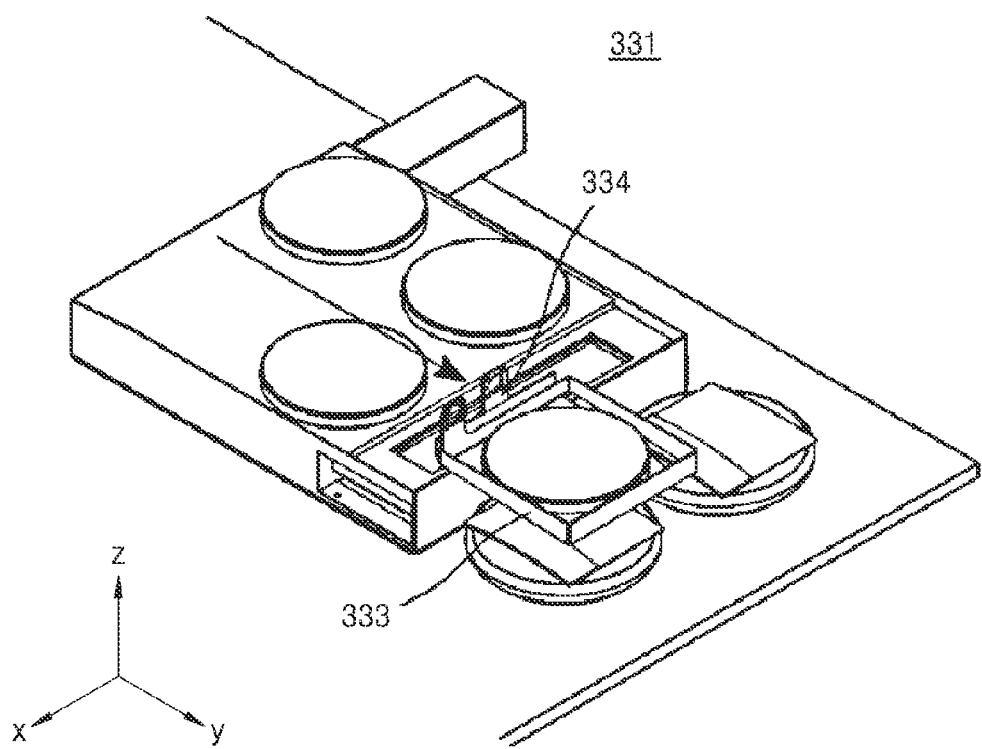

Referring to FIGS. 11E and 11F, in the state of FIG. 11E, the guide 333 and the spatula 334 are positioned vertically above a discharge unit of the first lower grill 61 by the guide linear unit 821 and the spatula linear unit 822.

Figure 11G:
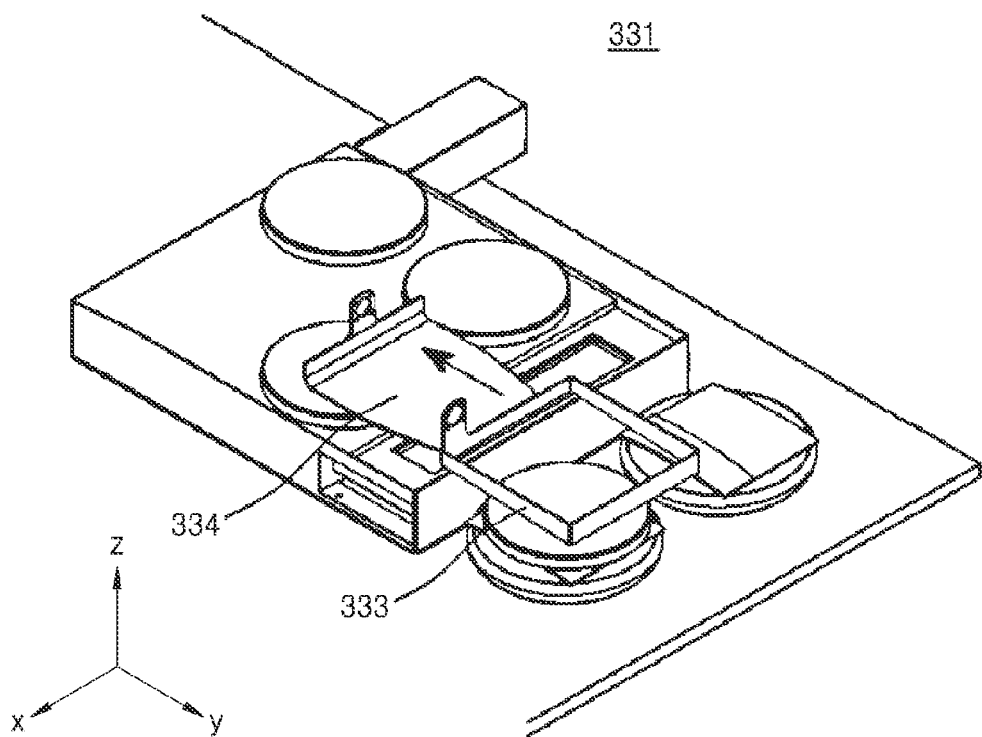

Referring to FIGS. 11F and 11G, in the state of FIG. 11F, the spatula 334 is retracted by the spatula linear unit 822, and thus the patty is placed on a hamburger being produced at the discharge unit.

Figure 11H:
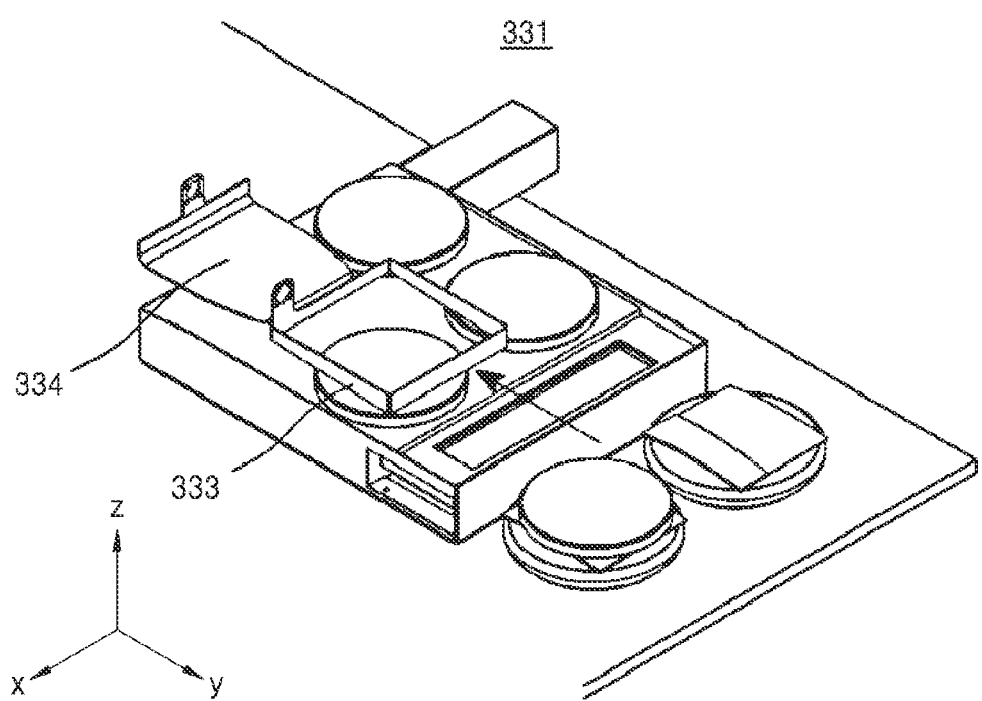

Referring to FIGS. 11G and 11H, in the state of FIG. 11G, the guide 333 and the spatula 334 are retracted by the guide linear unit 821 and the spatula linear unit 822, to prepare for a next process.

Figure 12:
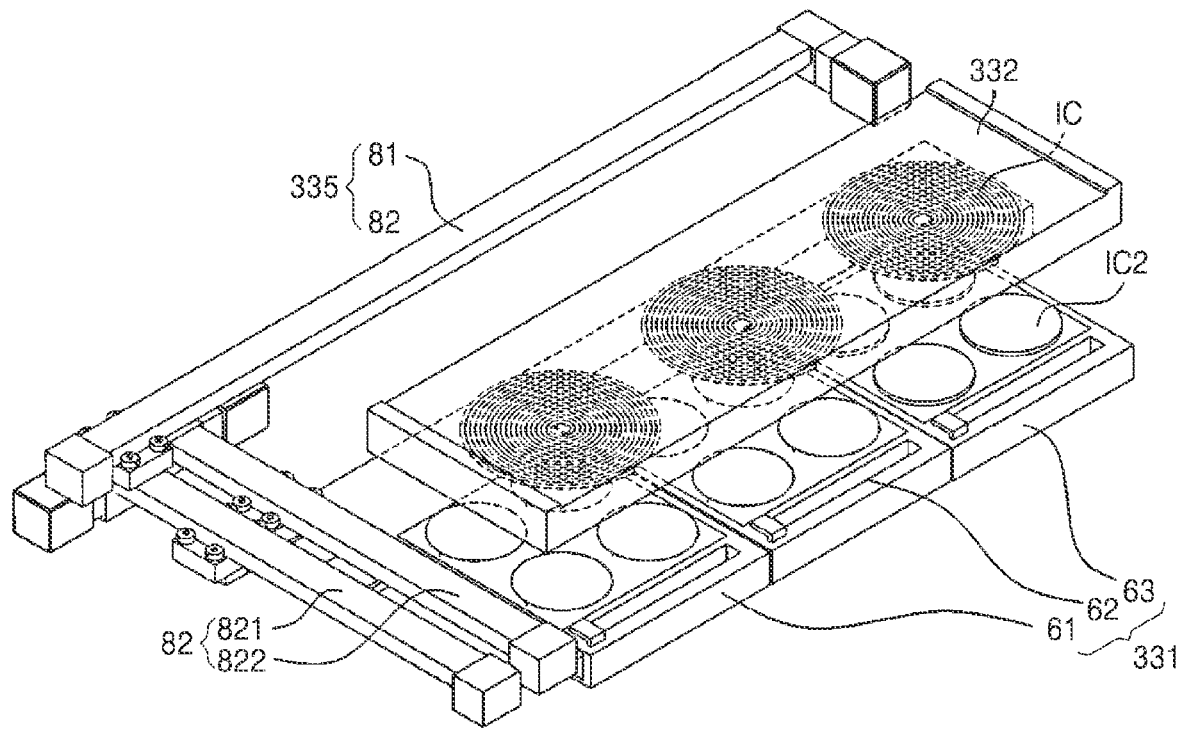
FIG. 12 is a perspective view illustrating a state in which three lower grills independently ascend and descend with respect to one upper plate grill, and a spatula and a guide selectively operate with respect to the lower grills.
Figure 13:
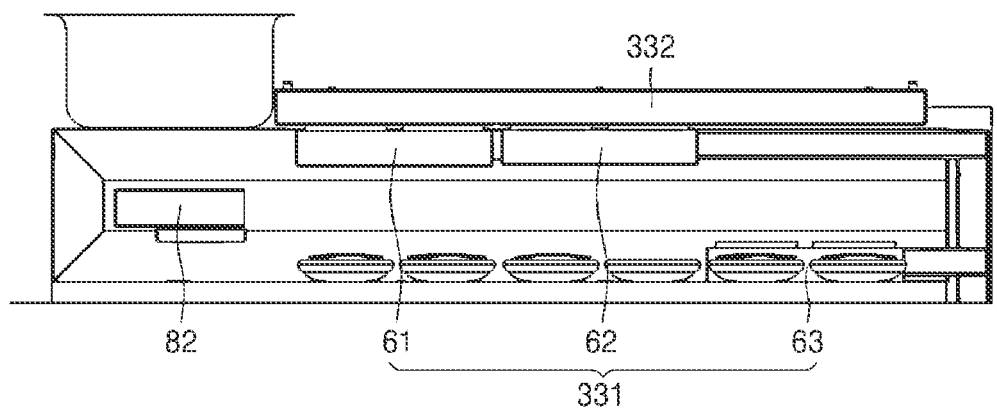
FIG. 13 is a front view illustrating a space through which the spatula and the guide move between the upper and lower plate grills in a state in which two lower grills are raised and one lower grill is lowered in FIG. 12.

FIG. 12 is a perspective view illustrating a state in which three lower grills 61, 62, and 63 independently ascend and descend with respect to one upper plate grill 332, and the spatula 334 and the guide 333 selectively operate with respect to the lower grills 61, 62, and 63, and FIG. 13 is a front view illustrating a space through which the spatula 334 and the guide 333 move between the upper and lower plate grills 332 and 331 in a state in which two lower grills 61 and 62 are raised and one lower grill 63 is lowered in FIG. 12.

Referring to FIGS. 12 and 13, the first, second, and third lower grills 61, 62, and 63 of the lower plate grill 331 independently ascend and descend with respect to one upper plate grill 332 by the first, second, and third lifting linear units 71, 72, and 73. Accordingly, a space is formed between the upper and lower plate grills 332 and 331, and the guide 333 and the spatula 334 may move through the space.

Accordingly, the third lower grill 63 descends while the first and second lower grills 61 and 62 ascend to cook patties, and thus the guide 333 and the spatula 334 move through the space to perform an operation of inserting and withdrawing a patty with respect to the third lower grill 63. Accordingly, in the patty grill module 33, a space may be saved, and the numbers of lifting linear units, guide linear units, and spatula linear units may be reduced.

Figure 14:
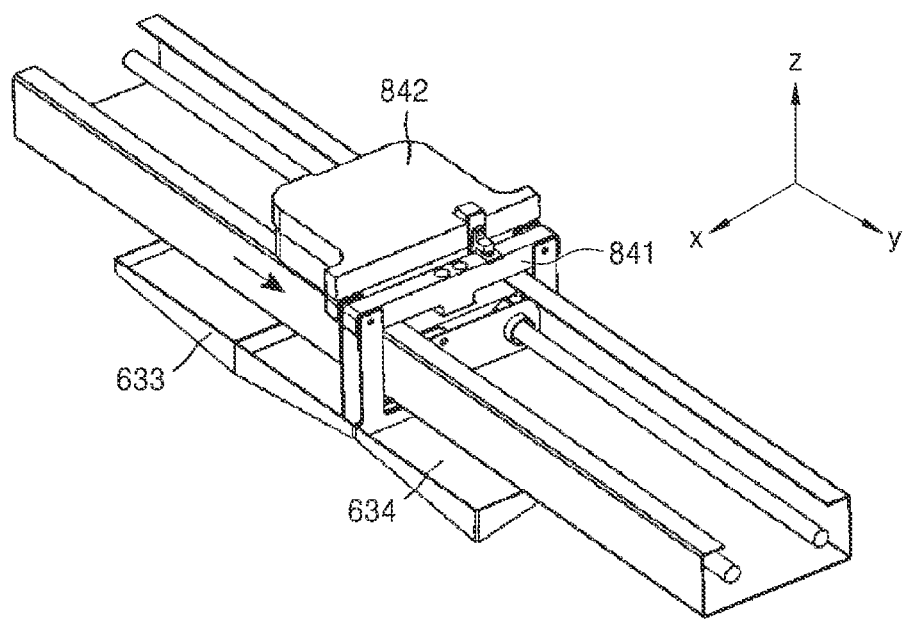
FIG. 14 is a perspective view illustrating a state in which a spatula and a guide manipulating a patty on a lower plate grill are coupled to each other, according to a second embodiment.
Figure 15:
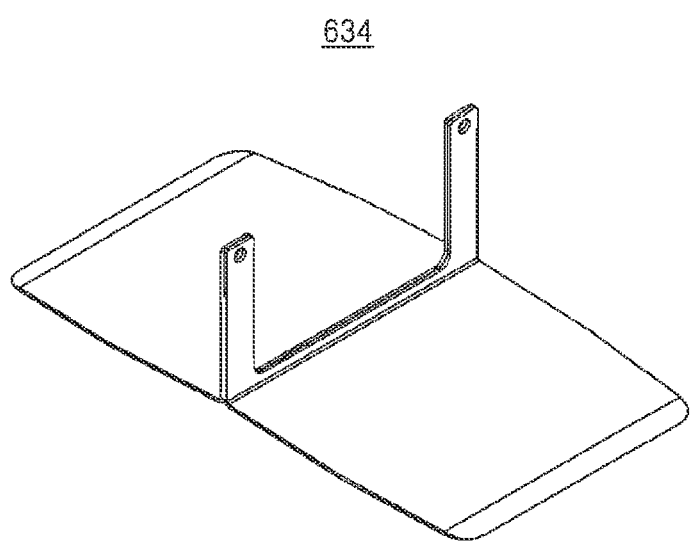
FIG. 15 is a perspective view of the spatula according to the second embodiment illustrated in FIG. 14.
Figure 16:
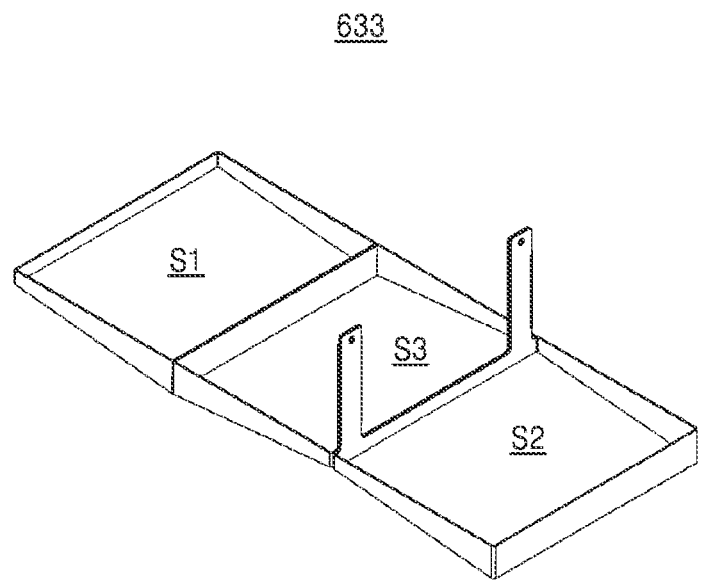
FIG. 16 is a perspective view of the guide according to the second embodiment illustrated in FIG. 14.
Figure 17:
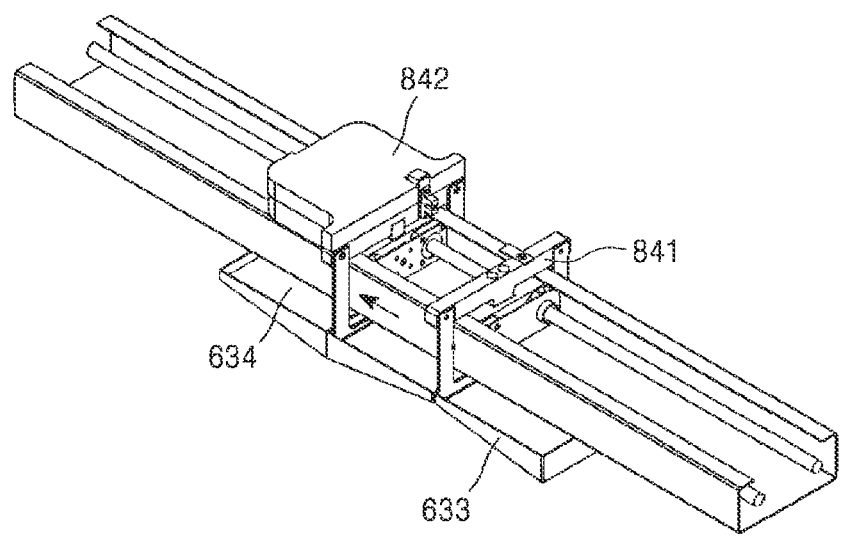
FIG. 17 is a perspective view illustrating an operating state of the spatula and the guide illustrated in FIG. 14.

FIG. 14 is a perspective view illustrating a state in which a spatula 634 and a guide 633 manipulating a patty on a lower plate grill are coupled to each other, according to a second embodiment, FIG. 15 is a perspective view of the spatula 634 according to the second embodiment illustrated in FIG. 14, FIG. 16 is a perspective view of the guide 633 according to the second embodiment illustrated in FIG. 14, and FIG. 17 is a perspective view illustrating an operating state of the spatula 634 and the guide 633 illustrated in FIG. 14. FIGS. 14 to 17 illustrate an automated process in which the guide 633 and the spatula 634 supply an uncooked object to be cooked and take out a completely cooked object after cooking.

Referring to FIGS. 14 to 17, the guide 633 that forms, with its frame, a first space S1 and a second space S2 which are respectively adjacent to opposite edges of an intermediate space S3, so as to selectively surround, within the first and second spaces, the perimeter of a patty before or after being inserted into the lower plate grill 331, is mounted on a guide linear unit 841.

The spatula 634 is arranged in an intermediate space S3 and is formed as a symmetrical plate that selectively operates in the first space S1 and the second space S2 to support the bottom surface of the patty, and is mounted on a spatula linear unit 842.

For example, the spatula linear unit 842 may operate to handle an uncooked patty in the first space S1 (see FIG. 17) and handle a cooked patty in the second space S2 (see FIG. 14). Accordingly, a cooked patty and an uncooked patty are handled by different parts of the guide 633 and the spatula 634, which may resolve sanity concerns.

Figure 18A:
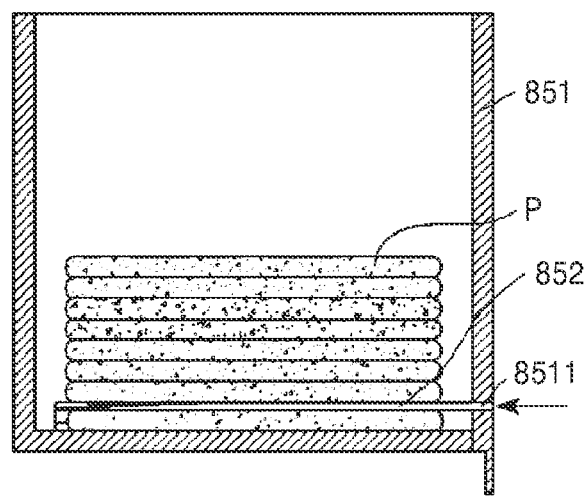
FIGS. 18A and 18B show, respectively, a front view and a plan view of a state in which a discharge spatula is inserted between patties stacked in a cache of a patty grill module applied to FIG. 1.
Figure 18B:
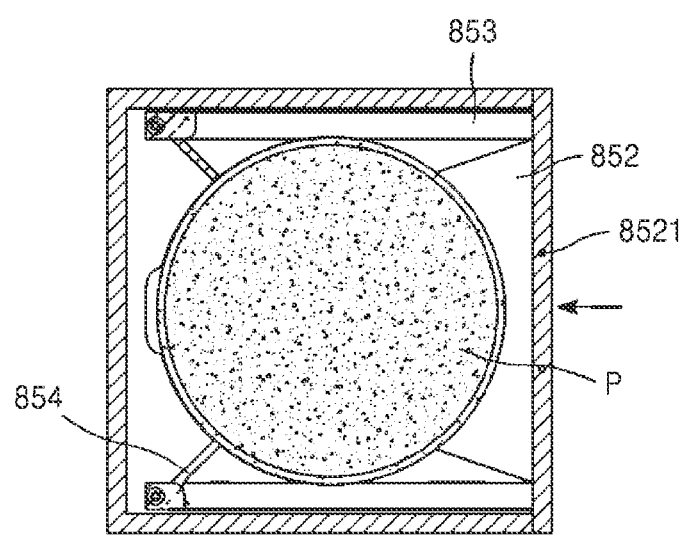
Figure 19:
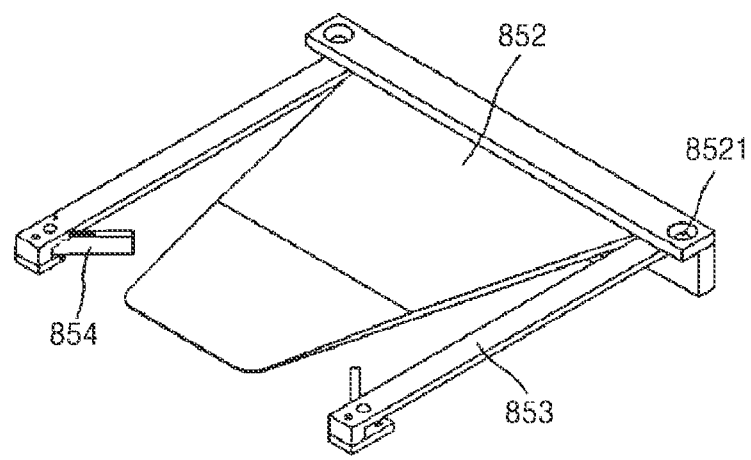
FIG. 19 is a perspective view of a discharge spatula applied to the cache of FIGS. 18A and 18B.

FIGS. 18A and 18B show, respectively, a front view and a plan view of a state in which a discharge spatula is inserted between patties stacked in a cache 851 of the patty grill module applied to FIG. 1, and FIG. 19 is a perspective view of the discharge spatula applied to the cache 851 of FIGS. 18A and 18B.

Referring to FIGS. 18A, 18B and 19, the patty grill module 33 further includes a cooking target supply unit, i.e., a patty supply unit 85. Hereinafter, the patty supply unit 85 will be described. The patty supply unit 85 is configured to store the patties P, which are objects to be supplied to the lower plate grill 331 and cooked, and to discharge, in the sense of supply, one patty at a time. For example, the patty supply unit 85 includes the cache 851, a separation spatula 852, separation bars 853, and holding members 854.

The cache 851 accommodates a plurality of patties P stacked therein, and includes a discharge port 8511 at the lower end thereof. The separation spatula 852 is configured to withdraw one patty P while being inserted and withdrawn between the patties P through the discharge port 8511.

The separation bars 853 are provided at both sides of the separation spatula 852 to be in contact with a perimeter of the patty P. The holding members 854 are configured to be folded when inserted and to be unfolded when withdrawn so as to pull the patty P with an elastic member 8541 provided at the front end of the separation bar 853.

Referring back to FIGS. 18A and 18B, the separation spatula 852 is inserted into the discharge port 8511 of the cache 851. Here, the separation bars 853 are moved to the sides of the patty P, the holding members 854 are moved in a folded state respectively at the front ends of the separation bars 853 while overcoming elastic force of the elastic members 8541, and the separation spatula 852 is completely inserted between the lowermost and second patties of the stacked patties P. Here, the holding members 854 are unfolded by elastic restoring force of the elastic members 8541 to hold the patty P.

Figure 20:
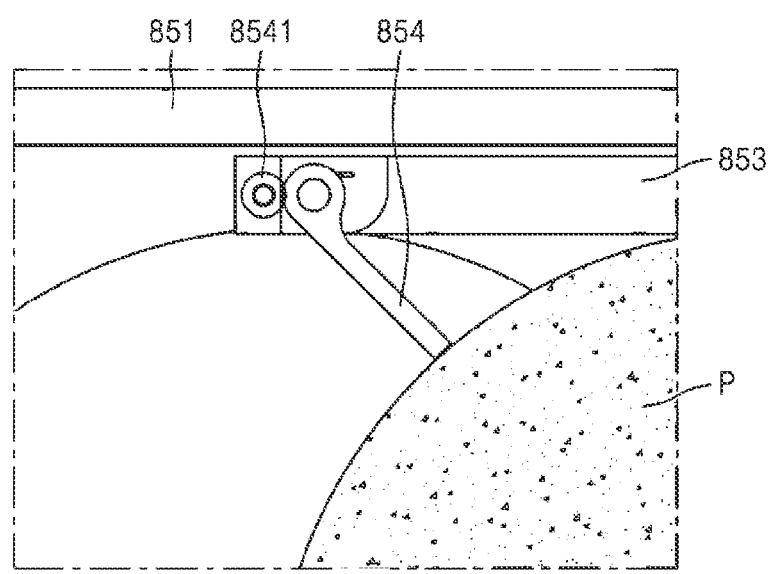
FIG. 20 is diagram illustrating a state of an operation of a discharge spatula starting to pull a patty.
Figure 21A:
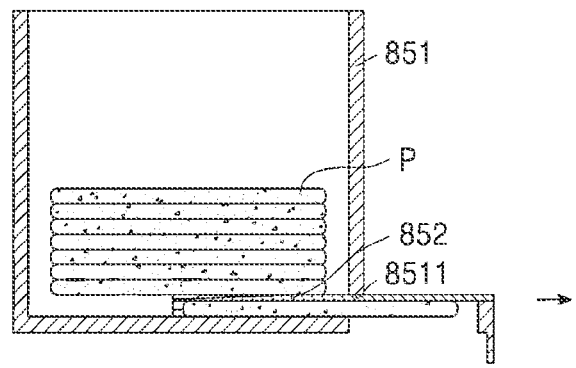
FIGS. 21A and 21B show, respectively, a front view and a plan view of a state of an operation of the discharge spatula is pulling out the patty, after the state of FIG. 20.
Figure 21B:
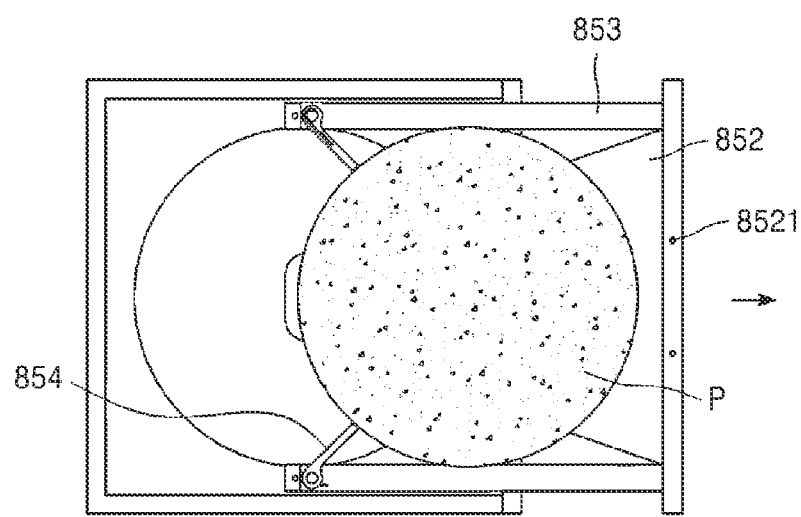

FIG. 20 is diagram illustrating a state of an operation of a discharge spatula starting to pull the patty P, and FIGS. 21A and 21B show, respectively, a front view and a plan view of a state of an operation of the discharge spatula is pulling out the patty P, after the state of FIG. 20. Referring to FIGS. 20, 21A and 21B, in a state in which the holding members 854 are unfolded to hold the patty P, the separation spatula 852 is withdrawn from the discharge port 8511.

Figure 22A:
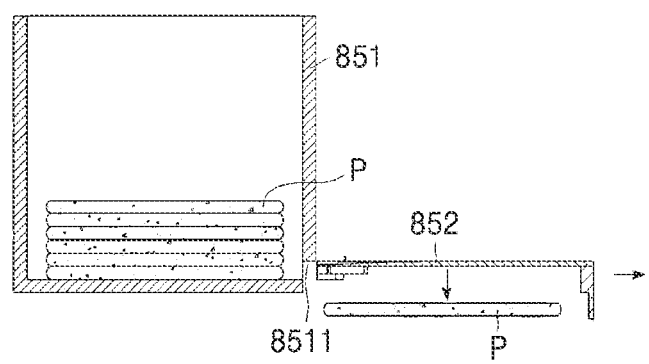
FIGS. 22A and 22B show, respectively, a front view and a plan view of a state of an operation of the discharge spatula dropping the patty, after the state of FIGS. 21A and 21B.
Figure 22B:
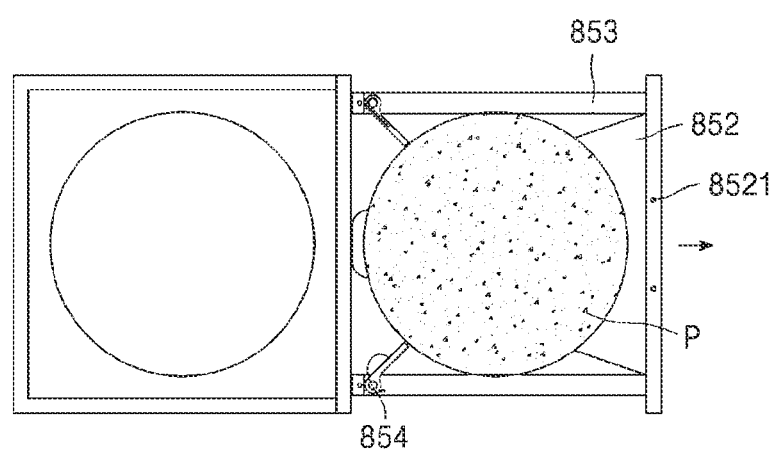

FIGS. 22A and 22B show, respectively, a front view and a plan view of a state of an operation of the discharge spatula dropping the patty P, after the state of FIGS. 21A and 21B. Referring to FIGS. 22A and 22B, in a state in which the holding members 854 are unfolded to hold the patty P, the separation spatula 852 is completely withdrawn from the discharge port 8511. Here, the separation spatula 852 mounted on a power transmission unit 8521 by hinges and torsion springs is rotated by the load of the patty P, and thus the patty P is dropped from the separation spatula 852.

Figure 23A:
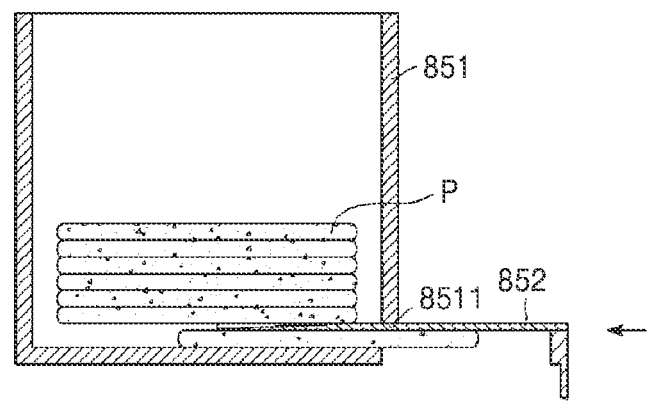
FIGS. 23A and 23B show, respectively, a front view and a plan view of a state in which the discharge spatula is inserted between patties of the cache again, after the state of FIGS. 22A and 22B.
Figure 23B:
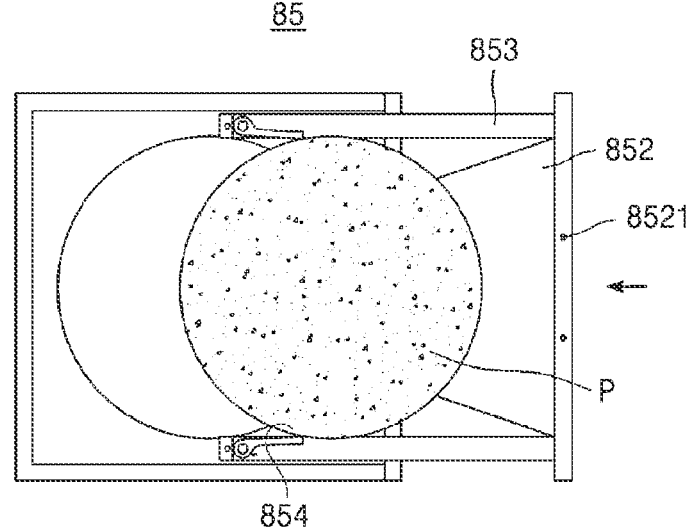

FIGS. 23A and 23B show, respectively, a front view and a plan view of a state in which the discharge spatula is inserted between the patties P of the cache 851 again, after the state of FIGS. 22A and 22B. Referring to FIGS. 23A and 23B, the separation spatula 852 is inserted back into the discharge port 8511 of the cache 851 to be in the state of FIGS. 18A and 18B and repeatedly operate.

Referring back to FIG. 1, the packaging module 40 performs an operation of separating package paper sheets or boxes into individual pieces and accurately positioning the individual pieces in the assembler module 50. The packaging module 40 performs a packaging finishing operation such as folding or covering a finished hamburger having been assembled on a package paper sheet or box by the assembler module 50, and then discharges the packaged hamburger through the assembler module 50, or directly discharges the packaged hamburger.

The assembler module 50 is a transfer unit for allowing a hamburger to be assembled while being transferred, and the automatic production management module 20 moves the assembler module 50 to be sequentially positioned at the plurality of cooking modules 30 and the discharge unit of the packaging module 40 according to the order for each type of hamburger. The region within which the assembler module 50 moves includes the entire region of the automatic production system, and the assembler module 50 has a speed for satisfying the highest production speed and the lowest delay time.

According to a general assembly order of a hamburger, the assembler module 50 is moved to the discharge unit of the packaging module 40 to receive a package paper sheet or box on which a hamburger is assembled, is moved to a module among the cooking modules 30 according to the order for each type of hamburger, and is moved between the cooking modules 30.

Here, the assembler module 50 may include at least one of a 1-axis robot with respect to X-axis Y-axis and Z-axis, a 2-axis robot, a 3-axis robot, a 4-axis robot such as a Selective Compliance Assembly Robot Arm (SCARA) robot, a 6-axis robot such as a cooperative robot arm, and an N-axis robot, which may be obtained by additionally combining a rotational motion with such multi-axis robots, and end effectors.

As described above, the grill module according to an embodiment of the present disclosure may transfer an object to be cooked and a completely cooked object without damage, by putting the object to be cooked onto a lower plate grill and driving a transfer unit for transferring a guide and a spatula for taking out the completely cooked object.

According to an embodiment, a plurality of lower grills are provided to ascend and descend, and transfer and heating of an object to be cooked are simultaneously performed by using a spatula, and thus required time, spaces, and costs may be reduced.

According to an embodiment, a cooking target supply unit is provided to withdraw and supply one of stack patties, particularly refrigerated or frozen objects to be cooked which are sticking to each other, thus stacked objects to be cooked may be separated from each other, and loss of cold air may be minimized.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A grill module comprising:
    at least one lower plate grill configured to support a flat object to be cooked;
    at least one upper plate grill configured to cook the object to be cooked, the at least one upper plate grill being disposed to face the at least one lower plate grill; and
    a transfer unit comprising:
    a first linear unit; and
    a second linear unit mounted on one side of the first linear unit, the second linear unit comprising a guide linear unit and a spatula linear unit on which a guide and a spatula are mounted;
    wherein the first linear unit is configured to move the guide and the spatula in a first direction (x-axis);
    wherein the guide linear unit is configured to move the guide in a second direction (y-axis);
    wherein the spatula linear unit is configured to move the spatula in the second direction; and
    wherein the guide and the spatula are configured to place the object to be cooked onto the lower plate grill and take out a completely cooked object.

2. The grill module of claim 1, further comprising at least one lifting linear unit,
    wherein the at least one lower plate grill is connected to the at least one lifting linear unit to be vertically movable.

3. The grill module of claim 2,
    wherein the at least one lifting linear unit comprises a first lifting linear unit and a second lifting linear unit;
    wherein the at least one upper plate grill is formed as a single unit;
    wherein the at least one lower plate grill comprises a first lower grill and a second lower grill,
    wherein the first lower grill is connected to the first lifting linear unit, and
    wherein the second lower grill is connected to the second lifting linear unit.

4. The grill module of claim 1,
    wherein the guide is formed as a frame to define a space surrounding a perimeter of the object to be cooked before or after being placed onto the at least one lower plate grill, and
    wherein the spatula is formed with a plate to support a bottom surface of the object to be cooked surrounded by the frame.

5. The grill module of claim 1,
    wherein the guide and the spatula are used in a semi-automated operation in which an uncooked object to be cooked is received from an external source with intervention of a human user, and the completely cooked object is taken out by the guide and the spatula after cooking, wherein the guide is formed as a frame to define a space surrounding a perimeter of the completely cooked object after being placed onto the at least one lower plate grill, and wherein the spatula is formed with a plate to support a bottom surface of the completely cooked object surrounded by the frame.

6. The grill module of claim 1, wherein the guide and the spatula are used in an automated operation in which an uncooked object to be cooked is supplied and the completely cooked object is taken out after cooking automatically, wherein the guide is formed as a frame to define a first space and a second space, which are respectively adjacent to opposite edges of an intermediate space, the first and second spaces being configured to selectively surround a perimeter of the object to be cooked or the completely cooked object before or after being placed onto the lower plate grill, and wherein the spatula is arranged in the intermediate space and formed as a symmetrical plate configured to selectively operate in the first space and the second spaces to support a bottom surface of the object to be cooked or the completely cooked object.

7. The grill module of claim 1, further comprising a cooking target supply unit configured to store objects to be cooked, which are to be supplied to the lower plate grill, and to discharge, in the sense of supply, one sheet of the objects to be cooked at a time.

8. The grill module of claim 7, wherein the cooking target supply unit comprises a cache for accommodating a plurality of objects to be cooked stacked therein, the cache including a discharge port at a lower side thereof, a separation spatula to withdraw one sheet of the plurality of objects to be cooked, while being inserted and withdrawn between the plurality of objects to be cooked through the discharge port, separation bars at both sides of the separation spatula to be in contact with a perimeter of the object to be cooked, and holding members to be folded when inserted and to be unfolded when withdrawn to pull the object to be cooked, with elastic members at front ends of the separation bars.

9. The grill module of claim 1, wherein the object to be cooked comprises at least one of bread, a patty, and steak meat.

10. A patty grill module comprising:

at least one lower plate grill configured to support a patty to be cooked;

at least one upper plate grill configured to cook the patty, the at least one upper plate grill being disposed to face the at least one lower plate grill; and a transfer unit configured to transfer a guide and a spatula for placing the patty to be cooked onto the at least one lower plate grill and taking out a completely cooked patty, wherein the transfer unit comprises:

a first linear unit configured to move the guide and the spatula in a first direction (x-axis); and a second linear unit mounted on one side of the first linear unit, the second linear unit comprising:

a guide linear unit configured to mount the guide and move the guide in a second direction (y-axis); and a spatula linear unit configured to mount the spatula and move the spatula in the second direction.

* * * * *